April 10, 1945.  I. K. DORTORT  2,373,297
ELECTRIC VALVE CONTROL SYSTEM
Filed Oct. 17, 1941
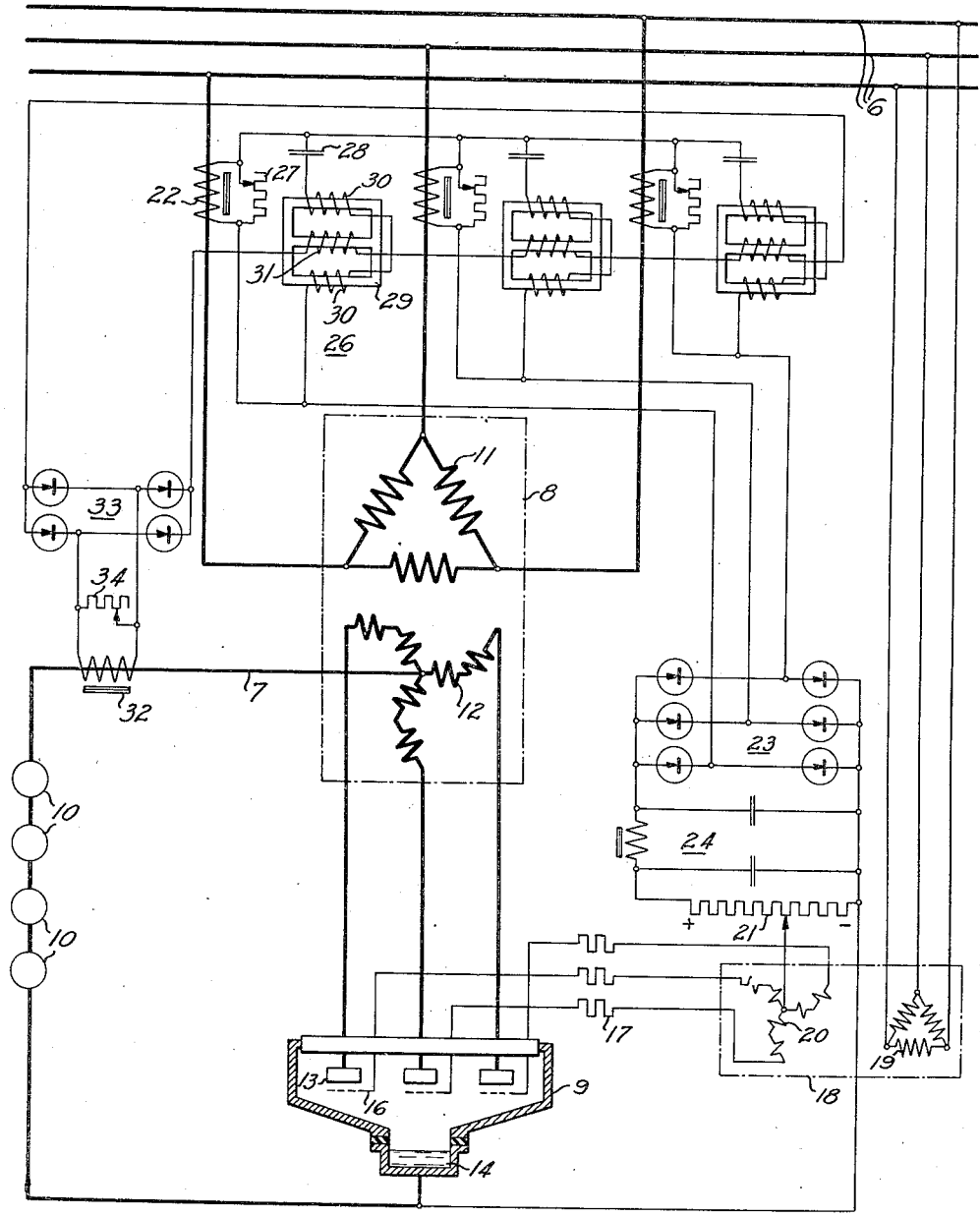
Inventor
I. K. Dortort
by Didier Journeaux
Attorney Patented Apr. 10, 1945

2,373,297

UNITED STATES PATENT OFFICE 2,373,297

ELECTRIC VALVE CONTROL SYSTEM

Isadore K. Dortort, Milwaukee, Wis., assignor to Allis-Chalmers Manufacturing Company, Milwaukee, Wis., a corporation of Delaware Application October 17, 1941, Serial No. 415,337

10 Claims. (Cl. 175—363)

This invention relates in general to improvements in electric valve control systems, and more particularly to means for maintaining substantially constant the flow of current through a direct current circuit connected with an alternating current circuit through an electric valve converting system.

The conversion of energy between an alternating current circuit and a direct current circuit is frequently effected by means of a translating system of the electric valve type and the system may be so controlled as to regulate one of its characteristics. More particularly, the current intensity through one of the circuits may be maintained constant, and static apparatus is often preferred for this purpose because of its rapidity of action. When static regulating apparatus is rendered responsive to the magnitude of the current flowing through the direct current circuit, the effect of the regulator is generally to maintain the average value of the direct current constant. In general, however, the direct current comprises an appreciable alternating component so that the root mean square value of the current often materially differs from its average value. Under certain operating conditions, as when the direct current circuit supplies load devices of resistive character such as incandescent lamps, it becomes desirable to regulate the current so as to maintain its root mean square value constant. Regulating means responsive to the average value of the current cannot be used alone for this purpose, but in general it will be sufficient to approximate the desired results by correcting such regulating means in response to the value of the alternating component of the current.

It is therefore one of the objects of the present invention to provide static regulating means for an electric valve converting system to maintain the flow of current of substantially constant root means square value in a direct current circuit.

Another object of the present invention is to provide an electric valve control system operable at will to maintain substantially constant either the average or the root mean square value of the current in a direct current circuit.

Another object of the present invention is to provide control means for an electric valve converting system for regulating the system in dependence in adjustable proportion upon the direct and alternating components of a direct current of the system.

Objects and advantages other than those above described will be apparent from the following description when read in connection with the accompanying drawing, which diagrammatically illustrates one embodiment of the present invention applied to the control of a group of electric valves operable for rectifying alternating current or for inverting direct current.

Referring more particularly to the drawing by characters of reference, an alternating current circuit 6 is connected with a direct current 7 through a converting system comprising a transformer 8 and a plurality of electric valves 9. Either circuit may be chosen as supply circuit for the system, but it will be assumed that circuit 6 is the supply circuit energized from a suitable generator (not shown) and that circuit 7 is a load circuit transmitting current to load devices of resistive character such as series connected incandescent lamps 10.

Transformer 8 comprises a primary winding 11 connected with the conductors of circuit 6 and a secondary winding 12 divided into a plurality of phase portions severally connected with the anodes 13 of the different valves 9. The valves may be provided with separate cathodes or the cathodes may be combined into a single cathode structure 14. Suitable known means (not shown) are provided for rendering the cathode emissive and for maintaining it in electron emissive condition as is well known.

The conductivity of valves 9 may be controlled by any suitable known means, preferably by means of control electrodes 16 of the grid type severally associated with anodes 13. Each control electrode is connected with cathode 14 through a control circuit comprising a current limiting resistor 17 and one of the secondary phase portions of a control transformer 18. The primary winding 19 of transformer 18 is energized from circuit 6. The secondary winding 20 of transformer 18 is connected in star to provide a neutral point connected with cathode 14 through a voltage divider 21. The voltage divider is connected to receive a current which is dependent upon the magnitude of the current in circuit 7 and which varies abruptly when the latter rises above a predetermined value to thereby prevent it from rising further.

The voltage divider current is supplied from at least one current transformer 22 having its primary winding inserted in one of the connections between winding 11 and circuit 6. The current transformer secondary windings are connected with the voltage divider through a suitable rectifying device 23 and through an electric filter 24 of any suitable known type. Each current transformer secondary winding is shunted by a nonlinearly resonant circuit 26 linked thereby with the alternating current circuit 6 and by an adjustable resistor 27. Each non-linearly resonant circuit comprises a capacitor 28 serially connected with a reactor 29 so dimensioned as to be in resonance therewith for the frequency of the voltage of circuit 7 when the reactor is not saturated. It will be understood, however, that other known types of non-linearly resonant circuits differently connected with current transformers 22 may be used instead.

The cores of reactors 29 are preferably made of material having a substantially constant permeability over a wide range of magnetization below the saturation point to cause circuits 26 to remain resonant when the current therethrough varies over a predetermined range.

Each reactor 29 is provided with an inductive winding 30 and with a saturating winding 31 so disposed on the reactor core as to affect the reactance of winding 30 in the same manner during both half-cycles of the voltage of circuit 6. The saturating windings are connected, through a rectifying device 33, with a current transformer 32 serially inserted in circuit 7. A portion of the current transformer secondary current may be bypassed from rectifying device 33 through an adjustable resistor 34.

The system being connected as above described and circuit 6 being energized, winding 20 of transformer 18 impresses on the different control electrodes alternating potentials which render the different valves 9 intermittently conductive. Winding 12 impresses on valves 9 voltages which bring the anodes 13 sequentially to positive potentials with respect to the potential of cathode 14 to transmit current sequentially from winding 12 to circuit 7. Each valve, however, becomes effective only when its control electrode is given a potential which is more positive than the potential of cathode 14.

The operation of the system will first be considered assuming that resistor 34 is short circuited so as to prevent the flow of current from current transformer 32 to saturating windings 31. If the resistance of circuit 7 is abnormally high, as a result of the insertion therein of an excessive number of lamps, for example, so that the flow of current through current transformers 22 does not reach its normal value, reactors 29 remain unsaturated. Under these conditions each reactor is resonant with the associated capacitor 28 for the frequency of the voltage of circuit 6. The resonant circuits therefore constitute substantial short circuits for current transformers 22 and substantially prevent the supply of current from the current transformers to voltage divider 21. Control electrodes 16 then receive only the alternating potentials of winding 20 and each control electrode becomes positive with respect to cathode 14 before the associated anode becomes positive. Each anode is then able to carry current as soon as it becomes positive with respect to the cathode and the flow of current through circuit 7 is taking place under the highest voltage obtainable, as is well known.

If the resistance of circuit 7 is then decreased to a value within the normal range of values for which the system is designed, the flow of current through circuits 6 and 7 tends to increase beyond the desired value. Resistors 27 are so adjusted that reactors 29 reach magnetic saturation when the current through circuit 7 reaches a value slightly below the desired value. The non-linearly resonant circuits then drop out of resonance during portions of the voltage cycle and their impedance increases abruptly during such cycle portions. The secondary currents of current transformers 22 are then divided between resistors 27, resonant circuits 26 and rectifying device 23. Device 23 rectifies the current received thereby from current transformers 22, which current is rendered substantially uniform by filter 24 and supplied to voltage divider 21. The voltage drop between the tap and the negative terminal of the voltage divider is superposed on the voltages of winding 20 to thereby delay the moment of the voltage cycle at which each control electrode 16 becomes positive. The control electrodes delay the moment of the cycle at which each anode 13 begins to carry current, thereby causing the voltage impressed on circuit 7 through valves 9 to decrease as is well known. Voltage divider 21 is so adjusted as to impress on the control electrodes the necessary potential to cause the current through circuit 7 to be maintained at substantially the desired average value.

If the resistance of circuit 7 is further decreased, the current through circuit 7 and the current of current transformers 22 tend to increase in proportion thereto. As soon as the current through circuit 7 begins to increase, the secondary currents of current transformers 22 increase to a corresponding extent and cause a proportionately much larger increase in the impedance of the non-linearly resonant circuits. The current through voltage divider 21 therefore increases in greater proportion than the current of circuit 7. Control electrodes 16 accordingly further delay the conductive periods of anodes 13 to allow the current through circuit 7 to rise only to a negligible extent in response to a large decrease in the resistance of the circuit. Conversely, if the resistance of circuit 7 is increased within its normal range of values, the flow of current through voltage divider 21 decreases to a much greater extent to cause the current of circuit 7 to decrease only to a negligible extent in response to a large increase in the resistance of the circuit.

When resistor 34 is short circuited, reactors 29 become saturated for a predetermined value of the current flowing through current transformers 22. The latter current corresponds to a predetermined average value of current in circuit 7 as a result of the converting action of transformer 8 and valves 9. This average value is also the value of the unidirectional component $I_1$ of the current of circuit 7. When the root mean square value I of the load current is to be maintained substantially constant, the alternating component $I_2$ of this current must also be taken into account, the relation between the load current and its components being $I=\sqrt{I_1^2+I_2^2}$. This relation may be expanded by the binomial theorem and the first two terms only retained with sufficient approximation because in general $I_2$ is relatively small compared to $I_1$. The root mean square value of the current is then given by the expression $I=I_1+KI_2$ where K is a coefficient equal to $$\frac{I_2}{2I_1}$$

This coefficient may be considered as constant for values of $I_1$ within a range depending on the desired degree of accuracy.

To maintain the root mean square value of the current of circuit 7 substantially constant, the short circuit is removed from resistor 34. Current transformer 32 then delivers to resistor 34 and rectifying device 33 an alternating current proportional to current component $I_2$. Resistor 34 is so adjusted with respect to resistors 27 that the currents through windings 30 and through windings 31 are in a ratio of $I_1$ to $KI_2$ or in a suitable ratio proportional thereto depending upon the relative numbers of turns of windings 30 and 31. The degree of magnetization of the cores of reactors 29 accordingly varies in dependence upon the quantity $I_1 + KI_2$. The effect of this magnetization below and into the saturation range is to cause voltage divider 21 to receive a current of such magnitude as to cause the control electrodes to maintain the root mean square of the value of the current flowing through circuit 7 at substantially the desired value I. In this manner the amount of energy absorbed by each lamp 10 remains substantially constant and the lamps operate at a uniform degree of brightness regardless of the variation in the voltage of circuit 6 or of changes in the number of lamps connected in circuit 7.

If desired, resistor 34 may also be so adjusted as to enhance or as to attenuate the effect of windings 31 relatively to that of windings 30 in accordance with the nature of the load connected with circuit 7.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. The combination of an alternating current circuit, a direct current circuit, electric valve means interconnecting said circuits for the flow of energy therebetween corresponding to the flow through said direct current circuit of unidirectional current having a root means square value different from the average value thereof, and static means only for controlling the conductivity of said valve means operable in response to said flow of energy to maintain said root mean square value substantially constant.

2. The combination of an alternating current circuit, a direct current circuit, electric valve means interconnecting said circuits for the flow of energy therebetween corresponding to the flow through said direct current circuit of current having a unidirectional component and an alternating component, and means for controlling the conductivity of said valve means comprising means operable in dependence upon the magnitude of said unidirectional component and means operable in dependence upon the magnitude of said alternating component only.

3. The combination of an alternating current circuit, a direct current circuit, electric valve means interconnecting said circuits for the flow of energy therebetween corresponding to the flow through said direct current circuit of current having a unidirectional component and an alternating component, and means for controlling the conductivity of said valve means comprising current responsive means operable in dependence upon the magnitude of said unidirectional component and means operable in dependence upon the magnitude of said alternating component only for modifying the action of said current responsive means.

4. The combination of an alternating current circuit, a direct current circuit, electric valve means interconnecting said circuits for the flow of energy therebetween corresponding to the flow through said direct current circuit of current having a unidirectional component and an alternating component, and means for controlling the conductivity of said valve means comprising means responsive to the magnitude of the flow of current through said alternating current circuit and means responsive to the magnitude of said alternating component only.

5. The combination of an alternating current circuit, a direct current circuit, electric valve means interconnecting said circuits for the flow of energy therebetween corresponding to the flow through said direct current circuit of current having a unidirectional component and an alternating component, and means for controlling the conductivity of said valve means comprising a non-linearly resonant circuit so connected with said alternating current circuit as to carry a current proportional to the current of said alternating current circuit, and means responsive to the magnitude of said alternating component for modifying the impedance of said non-linearly resonant circuit.

6. The combination of an alternating current circuit, a direct current circuit, electric valve means interconnecting said circuits for the flow of energy therebetween corresponding to the flow through said direct current circuit of current having a unidirectional component and an alternating component, and means for controlling the conductivity of said valve means comprising an element of said valve means, a source of alternating current, a non-linearly resonant circuit connected with said alternating current circuit, rectifying means connecting said non-linearly resonant circuit with said source, and means responsive to the magnitude of said alternating component for modifying the impedance of said non-linearly resonant circuit.

7. The combination of an alternating current circuit, a direct current circuit, electric valve means interconnecting said circuits for the flow of energy therebetween corresponding to the flow through said direct current circuit of current having a unidirectional component and an alternating component, and means for controlling the conductivity of said valve means comprising an element of said valve means, a source of alternating current, a non-linearly resonant circuit connected with said alternating current circuit, rectifying means connecting said non-linearly resonant circuit with said source, and means for modifying the impedance of said non-linearly resonant circuit comprising a current transformer serially connected with said direct current circuit and means for rectifying the output of said current transformer.

8. The combination of an alternating current circuit, a direct current circuit, electric valve means interconnecting said circuits for the flow of energy therebetween corresponding to the flow through said direct current circuit of current having a unidirectional component and an alternating component, and means for controlling the conductivity of said valve means comprising a control electrode of said valve means, a source of alternating current connected with said control electrode, a non-linearly resonant circuit comprising a reactor and a capacitor inductively connected with said alternating current circuit, said reactor having a saturating winding, rectifying means connecting said non-linearly resonant circuit with said source, a current transformer serially connected with said direct current circuit, and rectifying means connecting said current transformer with said saturating winding.

9. The combination of a supply circuit, a load circuit, one of said circuits being an alternating current circuit, an electric valve interconnecting said circuits for the flow of energy therebetween, and means for controlling the conductivity of said valve comprising an element of said valve, a nonlinearly resonant circuit connected with said alternating current circuit and with said element and comprising a reactor and a capacitor, said reactor being resonant with said capacitor for the frequency of the voltage of said alternating current circuit when said reactor is unsaturated, and means for variably saturating said reactor to cause said reactor to drop out of resonance with said capacitor during a variable portion of the voltage cycle of said alternating current circuit.

10. The combination of a supply circuit, a load circuit, one of said circuits being an alternating current circuit, an electric valve interconnecting said circuits for the flow of energy therebetween, and means for controlling the conductivity of said valve comprising an element of said valve and a non-linearly resonant circuit connected with said alternating current circuit and with said element and comprising a reactor and a capacitor, said reactor being resonant with said capacitor for the frequency of the voltage of said alternating current circuit when said reactor is unsaturated in response to the flow of current therethrough up to a predetermined value and being variably out of resonance with said capacitor for the frequency of the voltage of said alternating current circuit when said reactor is saturated in response to the flow of current therethrough above said predetermined value.

ISADORE K. DORTORT.